United States Patent

French

[11] Patent Number: 5,765,867
[45] Date of Patent: Jun. 16, 1998

[54] AIR BAG WITH EXTERNALLY MOUNTED TETHER

[75] Inventor: Sophia French, St. Clair Shores, Mich.

[73] Assignee: AlliedSignal Inc., Morristown, N.J.

[21] Appl. No.: 642,545

[22] Filed: May 3, 1996

[51] Int. Cl.$^6$ .................................................. B60R 21/16
[52] U.S. Cl. ............................... 280/743.2; 280/743.1
[58] Field of Search ........................ 280/728.1, 728.2, 280/743.1, 743.2, 728.3

[56] References Cited

U.S. PATENT DOCUMENTS

| | | |
|---|---|---|
| 3,879,056 | 4/1975 | Kawashima et al. |
| 5,004,266 | 4/1991 | Miller et al. ............... 280/743.2 |
| 5,062,644 | 11/1991 | Bishop et al. ............. 280/728.2 |
| 5,335,936 | 8/1994 | Faigle et al. .............. 280/728.3 |
| 5,447,329 | 9/1995 | Hamada ..................... 280/728.1 |
| 5,498,023 | 3/1996 | Adams et al. .............. 280/743.1 |

FOREIGN PATENT DOCUMENTS

| | | | |
|---|---|---|---|
| 19536603 A1 | 4/1997 | Germany . | |
| 2268132 | 5/1994 | United Kingdom ............. 280/743.2 |
| WO97/06984 | 2/1997 | WIPO . | |

*Primary Examiner*—Eric D. Culbreth
*Attorney, Agent, or Firm*—Markell Seitzman

[57] ABSTRACT

A vehicle occupant safety device using: an air bag module (22) including: a housing (24) having a plurality of walls (26a,b) defining a cavity (32) and an open end (30); an air bag (50) received within the cavity, and within the open end in a folded configuration and when inflated by inflation gas expands through the open end to an inflated configuration sufficient to protect the occupant; an inflator (40) operatively received with the housing (24) for providing inflation gas to inflate the air bag; and an external tether (70) enveloping the air bag, including at least one open sided breakable band for initially retarding the forward motion of the inflating air bag toward the occupant and for permitting the inflating air bag to inflate laterally or sideways while its forward motion is retarded and thereafter after the band is fully opened, to permit the air bag to inflate forwardly without retardation.

23 Claims, 5 Drawing Sheets

5,765,867

1

AIR BAG WITH EXTERNALLY MOUNTED TETHER

BACKGROUND AND SUMMARY OF THE INVENTION

The present invention generally relates to an occupant safety restraint device and more particularly to an air bag module with an externally mounted tether which controls the inflation trajectory of an inflating air bag.

When an air bag is inflated it is propelled rapidly toward the occupant. In order to reduce the forward velocity of the air bag relative to the occupant, tethers have been incorporated internal to the air bag. The tether, in addition to controlling the forward relative velocity of the inflating air bag, also controls its inflation shape and inflation trajectory.

It is an object of the present invention to provide an air bag system which utilizes an externally mounted tether to restrain and control the inflation of an air bag.

Accordingly the invention comprises: a vehicle occupant safety device comprising: an air bag module comprising: a housing having a plurality of walls defining a cavity having an open top; an air bag received within the cavity and maintained in a folded configuration prior to being inflated by an inflation means, inflator means operatively received within the housing for providing inflation gas to inflate the air bag; and external tether means comprising an open sided breakable band enveloping the exterior of the air bag for initially retarding the forward motion of the inflating air bag toward the occupant, the open sides of which permit the inflating air bag to inflate laterally or sideways while its forward motion is retarded by a frangible portion of the band, the band being torn, separated or peeled open as the air bag fully inflates. In one embodiment the external tether comprises a loop formed of a single piece of air bag material enveloping the folded air bag whereby the two panels are joined together by either sewing or bonding. In another embodiment the band is formed by joining two pieces of material by sewing or bonding. The bonding of the two panels can be obtained through numerous methods such as heat application, adhesives, and ultrasonic welding. Any reference to stitching or bonding will be considered as joining. Various other embodiments of the tether are also shown.

Many other objects and purposes of the invention will be clear from the following detailed description of the drawings.

BRIEF DESCRIPTION OF THE DRAWINGS In the drawings.

2

FIGS. 9 through 13 illustrate further embodiments of the invention.

FIGS. 14 AND 15 illustrate alternate tether constructions.

DETAILED DESCRIPTION OF THE DRAWINGS

Figure 1:
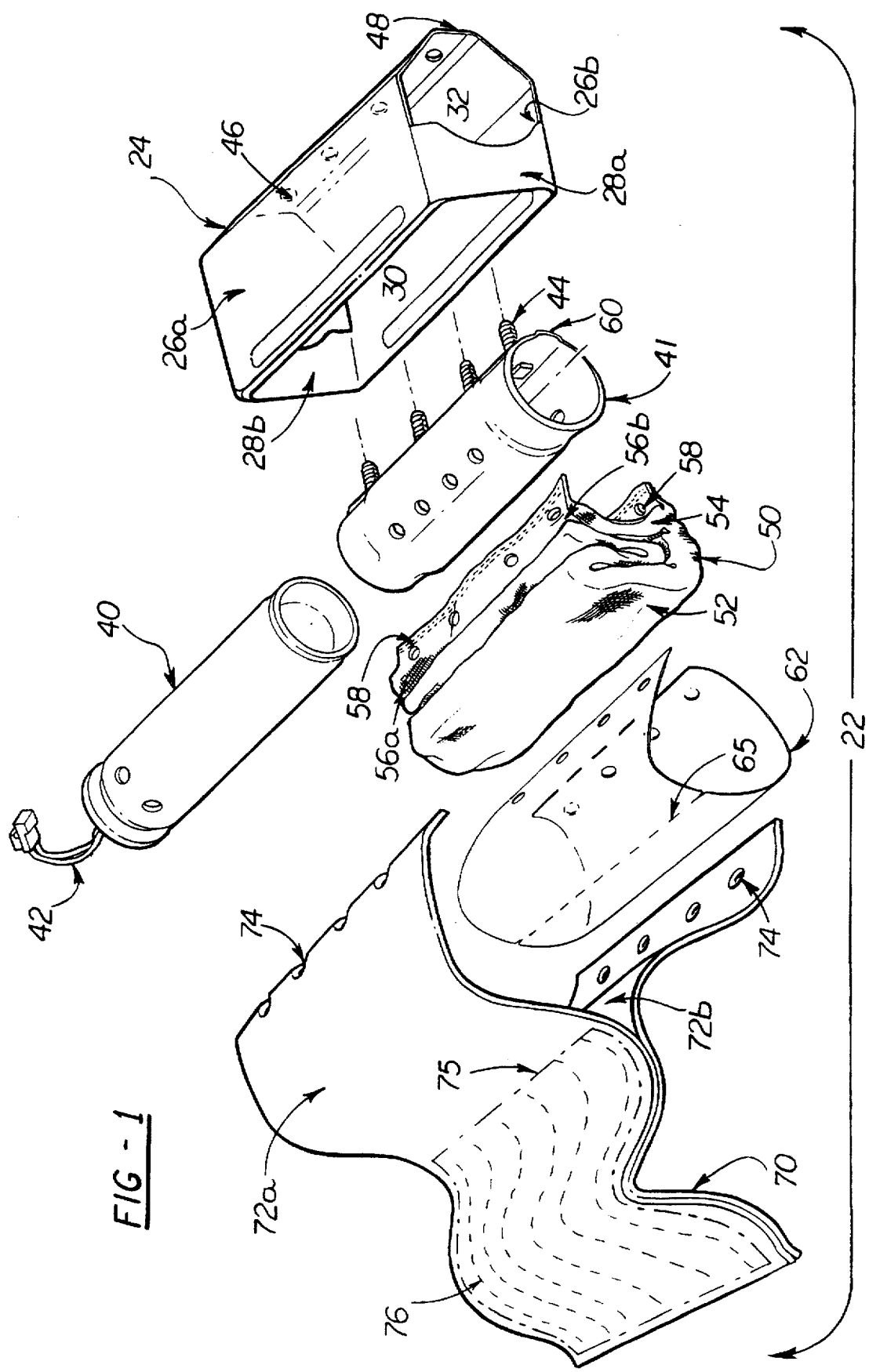
FIG. 1 is an assembly view of an air bag module.

Reference is made to FIG. 1 which illustrates an air bag module generally shown by numeral 22. The module includes a housing 24 of known variety having a plurality of sides 26a and 26b, and ends 28a and 28b defining an open sided or top, or open wall portion 30. The interior of the housing defines a cavity 32. The inflator 40 is of known construction and includes a pyrotechnic squib or initiator that is activated upon receipt of an electric activation signal via wires 42. The inflator may be supported within a hollow manifold 41 (as is the case with a hybrid inflator) having a plurality of threaded studs 44 which are received through a respective corresponding opening 46 within a lower portion 48 of the housing. In other design variations not utilizing a manifold, the inflator will possess the studs (as may be the case of an inflator with a solid propellant). Hereinafter, any reference to either manifold or inflator studs will simply be referred to as "studs". The module 22 additionally includes an air bag 50 of known construction having a cushion portion 52 which when inflated envelopes and protects the occupant. The cushion portion extends from a neck portion 54 which includes a plurality of flaps 56a and 56b, and each of the flaps includes a plurality of stud holes such as 58 which are used to mount the air bag 50 onto the inflator or manifold, as the case may be, within the housing.

During assembly the flaps 56a and 56b are overlapped about a rear portion 60 of the manifold with each of the studs 44 extending through a corresponding one of the stud holes 58 in each of the flaps 56a and 56b. With the air bag 50 now attached to the manifold the cushion portion 52 of the air bag is folded into a compact configuration and maintained in such a configuration with a tearable loop of material 62 such as Tyvek as used in the prior art. This loop of material also includes a plurality of stud holes which are overlapped about the manifold. As is known the tearable loop 62 may include one or more perforation lines 65 which are torn as the air bag inflates. During assembly, the inflator is pressed into the manifold and aligned such that both ends of the inflator are even with the ends of the manifold. The air bag cushion 50, the tearable loop of material 62, and the external tether 70 are assembled onto the manifold. As part of the final assembly operation, the manifold with the above components is inserted through the open side of the housing 30, and the studs 44 are aligned with the openings 46, and fastened together.

Figure 2:
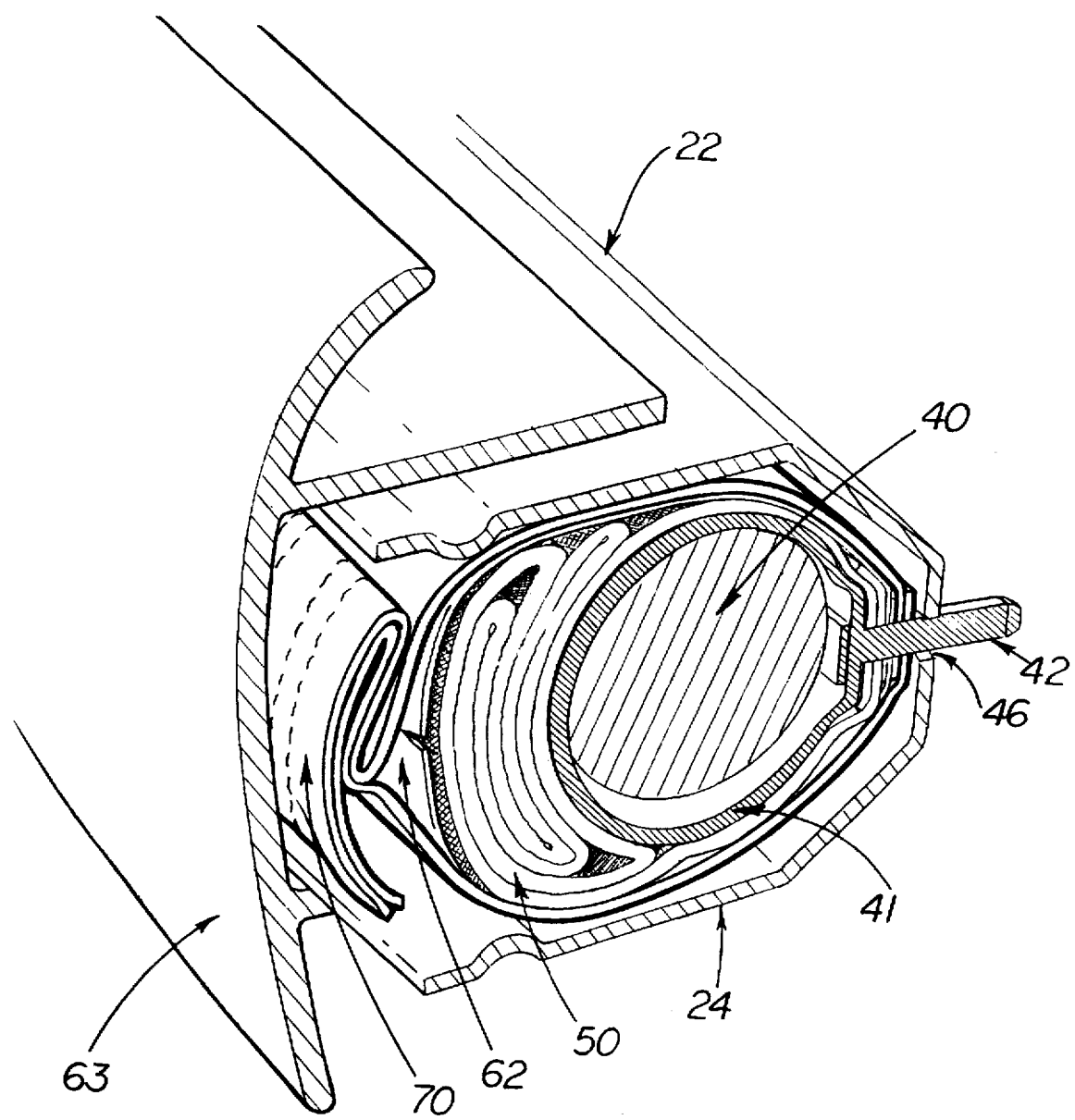
FIG. 2 is a cross-sectional view of an air bag module.

FIG. 2 illustrates a cross-sectional view of the assembled module 22 with a deployable cover 63 showing the air bag 50 folded about the manifold 41 and held thereto by the tearable material 62 with the studs extending through the openings 46 within the housing. An external tether 70 is positioned external to the tearable material 62, and engaged with the studs. A deployable cover 63 is attached to the housing 24 to protect the air bag 50. The cover is moved away from the housing by the air bag as it inflates.

Figure 3:
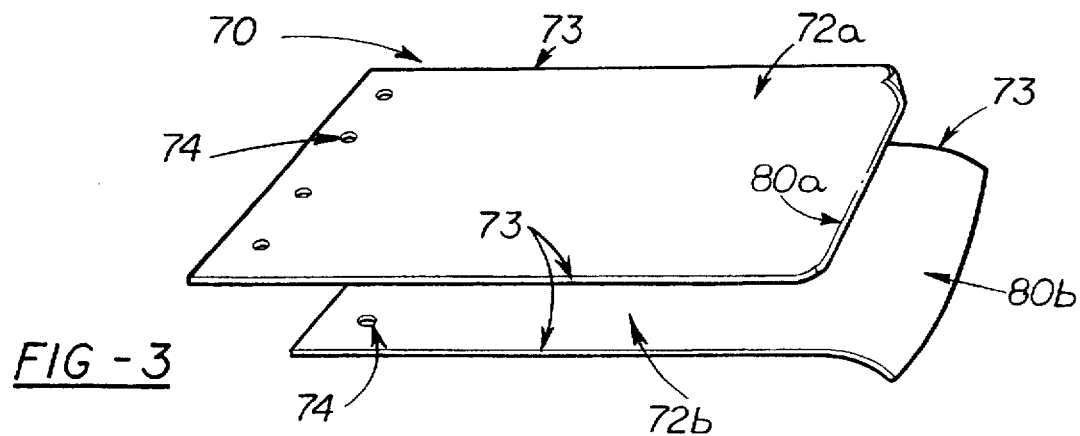
FIG. 3 illustrates a two-piece tether or restraint prior to its panels being joined together.
Figure 5:
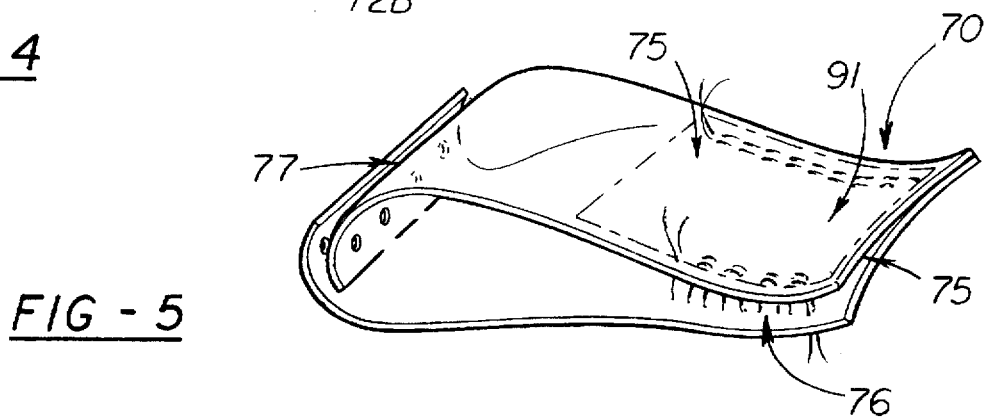
FIG. 5 illustrates the two-piece tether with its panels joined together.

Reference is briefly made to FIGS. 3 and 5 which illustrate one embodiment of an external tether generally shown as 70. The tether 70 is also shown in FIGS. 1 and 2. The illustrated tether comprises two pieces of material overlaid to form panels 72a and 72b having stud holes or openings 74 near its ends. As can be seen each panel has sides 73. The number and spacing of the openings 74 correspond to the number and spacing of the studs 44. The right hand ends of the two panels are joined such as by sewing or bonding throughout an area generally shown by numeral 75. The panels 72a and 72b are overlaid such that the openings 74 in each panel are registered on to the other, yielding the configuration illustrated in FIG. 5. The tether 70 is formed into a looped portion 90 and a joined-together portion 91 by fabricating within each of the panels 72a and 72b a plurality of breakable or frangible stitches or bond 76. In all of the figures the area identified as 75 represents the region of the portion 91 of the panels 72a,b whereby either stitches or an alternative joining technique is used. As will be seen from the description below, the plurality of stitches/bonds 76 provides a means for retarding the forward motion of the cushion portion 52 of the air bag 50 while encouraging lateral inflation. The advantage achieved by utilizing the two-piece construction is one of improved reinforcement at the location of the stud holes 74 during deployment. It can be appreciated that additional reinforcements can be incorporated in all embodiments of the design.

In another embodiment of the invention the tether 70 is constructed from a single piece of material (see FIG. 4) having a single set of openings 74 formed therein and overlapping panels 72a,b.

Figure 4:
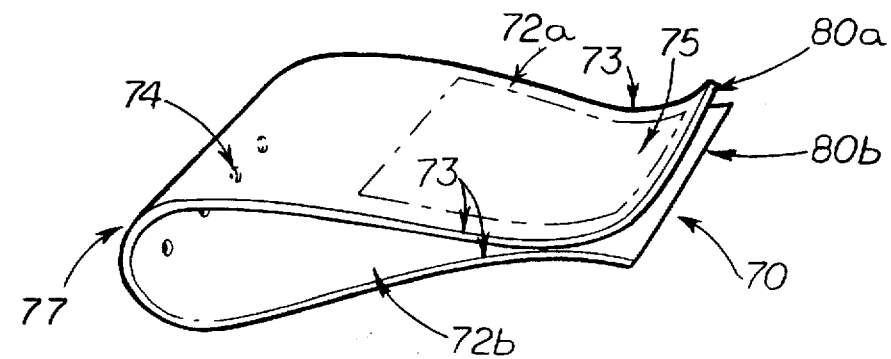
FIG. 4 illustrates a one-piece external tether prior to its panels being joined together.

In the illustrated embodiments of FIGS. 3-5 of the invention the width of each panel or portion 72a and 72b is generally chosen to be approximately equal to the width open top of the housing. The length of each of the first and second portions 72a and 72b, that is the length generally measured from the openings 74 to the ends 80a and 80b, is generally chosen to be dependent upon the size of the inflated air bag and the sustained level of retarding force desired to retard the forward motion of the air bag. The length of the panel (or half of the tether shown in FIG. 4) should be adequate to affix the openings 74 to the studs 44 and to permit the panels 72a and 72b to wrap around the tearable material 62, and manifold/inflator. The panels 72a and 72b generally meet in the center of the opening 30 of the housing 24 generally above the perforation line of the tearable loop 62.

Figure 6:
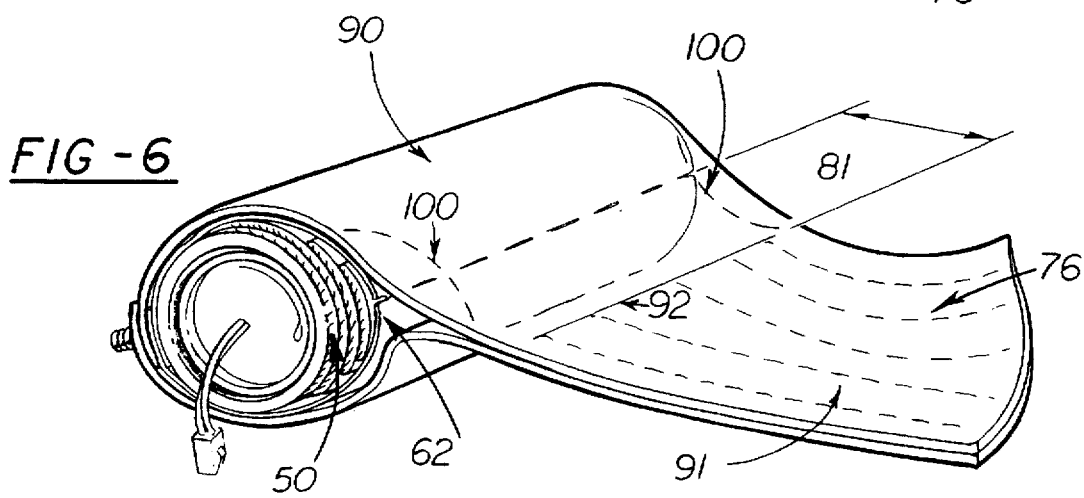
FIG. 6 illustrates the external tether positioned about a manifold or inflator.

The joined panels also incorporate a tear stitch offset 81 (see FIG. 6). This optional offset 81 provides additional length or slack between the exterior surface of the tearable material 62 (i.e. the compacted position of the air bag 50) and the first set of stitches (or initial edge of the bond) 92 of the tear stitches/bond 76. This slack permits the air bag to expand unobstructedly from the housing and thereafter expand laterally. As can be seen from FIGS. 14 and 15 the off-set 81 need not be centered about the opening 30 of the housing nor do the initial lines of stitches nor the initial bond line of the bonded panels need to be centered. FIG. 14 shows the offset 81 and the initial line of stitches/bonding proximate the upper side of the opening 30 and FIG. 15 shows the off-set and stitches/bonding proximate the lower side of the opening. This positioning and subsequent joining of the two panels can also be positioned in the full range between the top and bottom of the housing.

Figure 7:
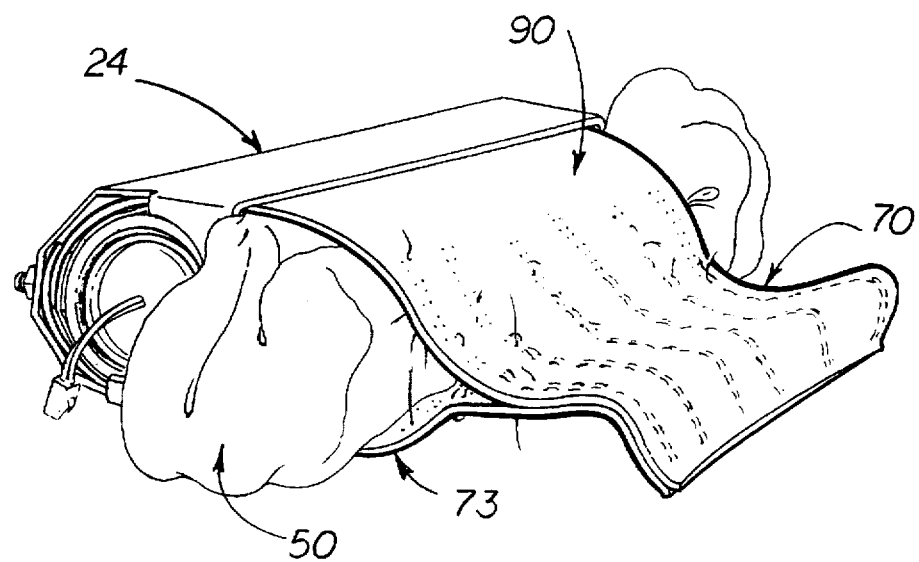
FIG. 7 is an orthogonal view showing the air bag expanding forwardly and laterally out from the housing.

FIGS. 6 and 7 are views showing the orientation of the tether 70 and its panels 72a and 72b about the housing 24 and the tearable material 62. When positioned about the housing the openings 74 of the tether are received about the studs. The manifold or inflator is secured to the housing by a plurality of nuts 96 (see FIG. 8) received about a corresponding stud 44.

Figure 8:
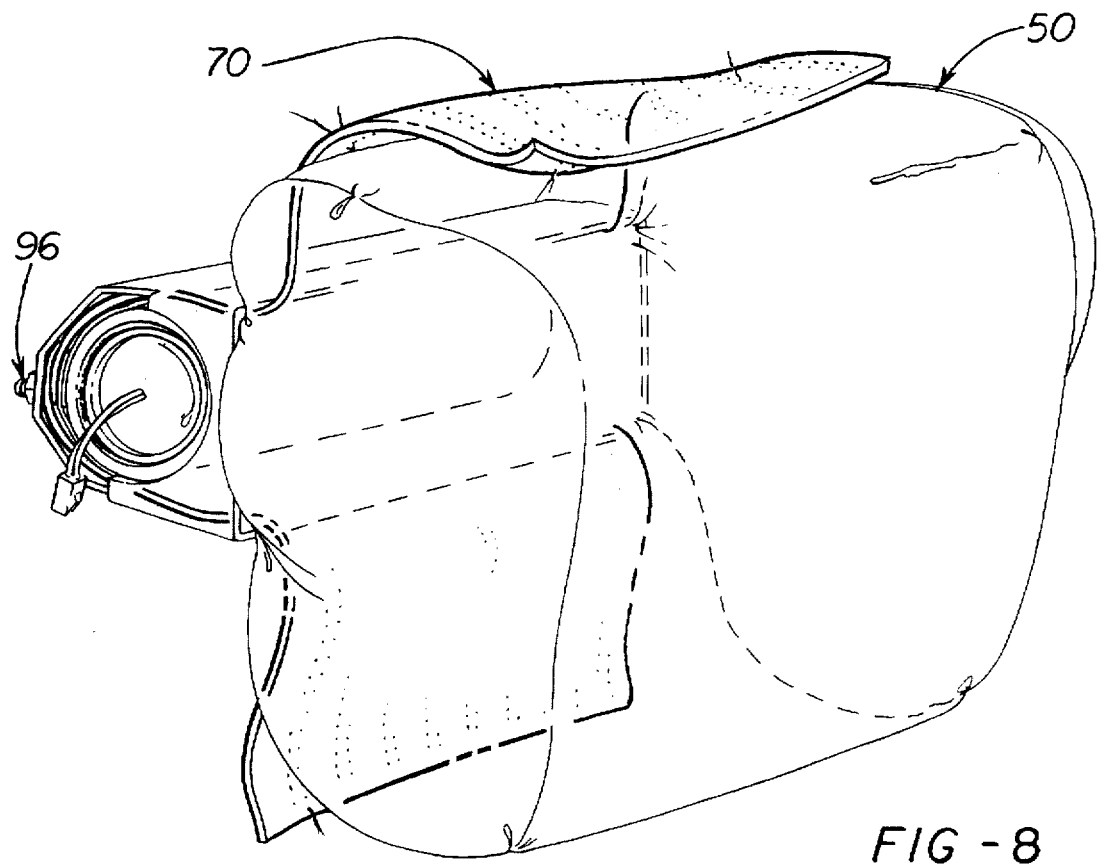
FIG. 8 illustrates the relationship of the various components of the present invention once the air bag has been fully inflated.

Upon receipt of a signal indicative of a crash, the inflator 40 is activated releasing or generating inflation gas. This gas enters the folded cushion 52. As the cushion expands outwardly its forward motion (through the stitch offset 81 if used) is resisted by the joined area 75 holding the panels 72a and 72b of the tether together. As a greater amount of inflation gas enters the cushion, the cushion simultaneously pushes forward breaking individual stitches (or separating the bonds), enlarging the loop portion 90 of the tether. With the forward motion of the air bag restricted due to action of the plurality of stitches 76 or bonded regions, the cushion 52 will expand laterally out from the housing 24 (see FIG. 7) through the open sides 73 of the looped portion 90 of the tether 70. As the cushion is urged forwardly against the restraining force of the stitches or bonded regions, the panels 72a,b open a greater amount until the cushion 52 is completely inflated and all of the joined areas are opened. This configuration is illustrated in FIG. 8.

Figure 9:
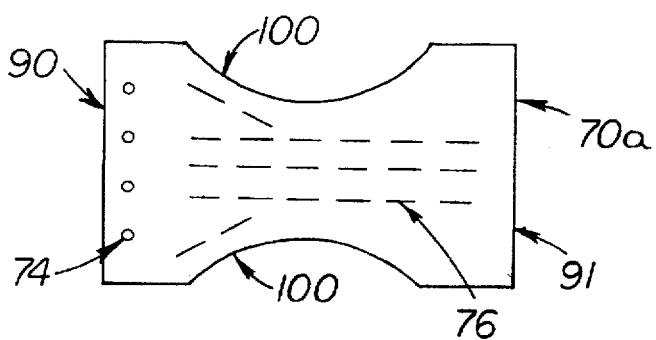
Figure 10:
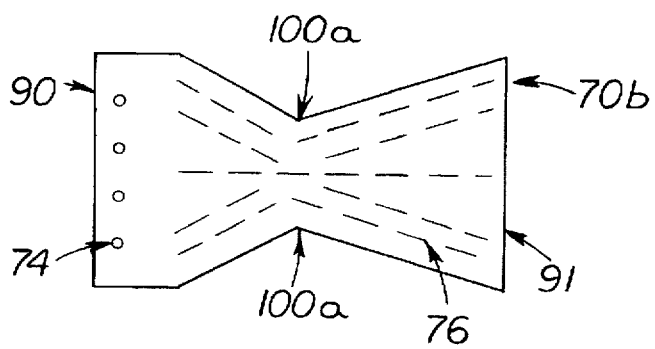

FIGS. 9-13 show top views of alternate embodiments of a tether. Each alternate tether can be constructed from a single piece of material such as shown in FIG. 4 or two pieces of material such as shown in FIG. 3. FIG. 9 shows a tether 70a having its two tether portions 72a,b having an arcuate cut-out 100. One or two sets of openings 74 will be used depending on whether one or two panels 72 is used. The cut-out 100 is positioned just forward of the housing 24. Reference is briefly made to FIG. 6 which shows in phantom line the general location of the cut-out 100. As can be seen this cut-out narrows the width of the panels 72a,b which will encourage the air bag to inflate laterally as less material is restricting its motion. FIG. 10 shows another embodiment of a tether 70b in which the sides of each portion 72a,b have a cut-out 100a formed by straight lines.

Figure 11:
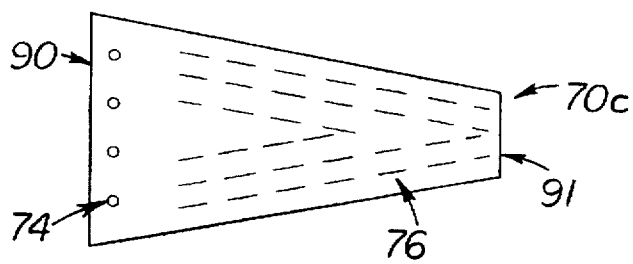
Figure 12:
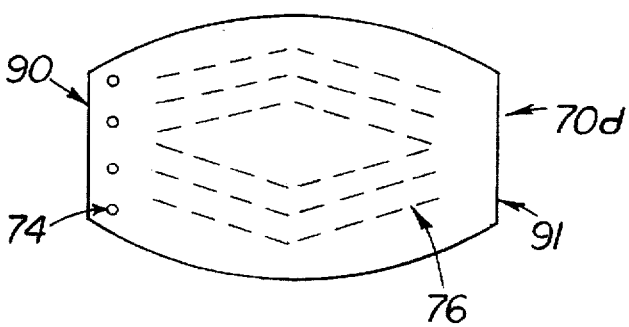
Figure 13:
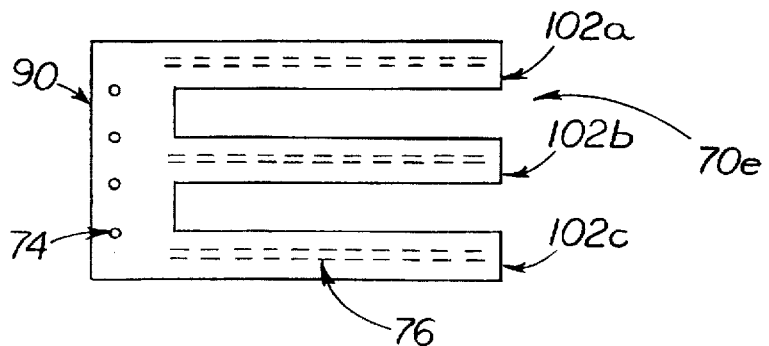

FIG. 11 shows a tether 70c having a generally truncated triangle shape while FIG. 12 shows an oval/oblong tether 70e. The tether 70d of FIG. 13 has its panels 72a,b formed as a plurality of extending, separated fingers 102a-c.

While it is contemplated that the tether panels 72a,b are constructed of air bag material, it is not necessarily a requirement of the invention in that the tether can be constructed of a plurality of strips of woven seat belt material (similar to the configuration shown in FIG. 13 but without the mutual connection), in which case the width of each tether would be approximately 25-75 mm. Additionally, the tether can be constructed of any material that lends itself to bonding, such as nylon woven material, a plastic laminate or film. As can be appreciated each of the above alternate tether embodiments can be sewn or bonded together.

Many changes and modifications in the above described embodiment of the invention can, of course, be carried out without departing from the scope thereof. Accordingly, that scope is intended to be limited only by the scope of the appended claims.

I claim:

1. A vehicle occupant safety device comprising:
    an air bag (50) initially in a folded configuration and when inflated by inflation gas expands to an inflated configuration to protect the occupant;
    inflator means (40) for providing inflation gas to inflate the air bag;
    external tether means (70) comprising at least one open sided, breakable band loosely positioned about the exterior of the folded air bag for permitting the air bag to inflate forwardly a predetermined distance and thereafter after the air bag has contacted a forward portion of the band retarding the forward motion of the inflating air bag toward an occupant while permitting the inflating air bag to inflate laterally or sideways while its forward motion is retarded and thereafter after the band is fully opened, to permit the air bag to inflate forwardly without retardation.

2. A vehicle occupant safety device comprising:

an air bag (50) initially in a folded configuration and when inflated by inflation gas expanding to an inflated configuration to protect the occupant;

inflator means (40) for providing inflation gas to inflate the air bag;

external tether means (70) initially about a portion of the exterior of the folded air bag, comprising first means for initially retarding the forward motion of the inflating air bag toward an occupant and for permitting the inflating air bag to inflate laterally or sideways while its forward motion is retarded and then for permitting the air bag to controllably travel forwardly, wherein the external tether means comprises: at least one piece of material formed into a loop portion (90) about the air bag (50) and a frangible portion (91) extending a substantial distance from the loop portion.

3. The device as defined in claim 2 wherein the frangible portion (91) comprises a first and a second panel portion (72a,b) joined together along substantially the entire length of the frangible portion, wherein the joined together portions are pulled apart in a serial manner in response to the forward motion of the air bag, the joined portion being completely separated as the air bag inflates toward the occupant.

4. The device as defined in claim 3 wherein the first and second panel portions are joined together by one of sewing and bonding.

5. The device as defined in claim 2 wherein the the external tether means is formed by two pieces of joined material.

6. The device as defined in 2 wherein the external tether means includes a single piece of material.

7. The device as defined in claim 2 wherein the loop portion (90) has a diameter greater than that of the folded air bag to provided an off-set (81) therebetween to enable the air bag to expand forwardly a small distance and thereafter to expand laterally out from the housing.

8. The device as defined in claim 2 wherein sides of the tether means include a narrowed portion.

9. The device as defined in claim 8 wherein the narrowed portion is formed by an arcuate concave section.

10. The device as defined in claim 8 wherein the narrowed portion is formed by an angled notch.

11. The device as defined in claim 2 wherein the tether means wherein the frangible portion is of a generally truncated triangular shape.

12. The device as defined in claim 2 wherein sides of the frangible portion of the tether means are convex shaped.

13. The device as defined in claim 2 wherein the frangible portion includes a plurality of spaced bands (102) extending from the loop portion.

14. The device as defined in claim 2 including a housing for supporting the inflator means.

15. A vehicle occupant safety device comprising:

an air bag (50) initially in a folded configuration and when inflated by inflation gas expands to an inflated configuration to protect the occupant;

inflator means (40) for providing inflation gas to inflate the air bag;

external tether means (70) initially about a portion of the exterior of the folded air bag, for initially retarding the forward motion of the inflating air bag toward an occupant and for permitting the inflating air bag to inflate laterally or sideways while its forward motion is retarded, wherein the tether means is off-set (81) from the air bag to provide an open sided loop to permit the air bag to expand laterally outwardly.

16. A vehicle occupant safety device comprising:

an air bag module (22) comprising:

external tether means (70) comprising at least one open sided, breakable band loosely positioned about the exterior of the folded air bag for permitting the air bag to inflate forwardly a predetermined distance and thereafter after the air bag has contacted a forward portion of the band for sequentially tearing to slow the forward motion of the inflating air bag toward an occupant while permitting the inflating air bag to inflate laterally or sideways while its forward motion is slowed and thereafter after the band is fully opened, to permit the air bag to inflate forwardly without retardation.

17. A vehicle occupant safety device comprising:

an air bag module (22) comprising:

external tether means (70) initially about a portion of the exterior of a folded air bag, for initially retarding the forward motion of the inflating air bag toward the occupant and for permitting the inflating air bag to inflate laterally or sideways while its forward motion is retarded, wherein the external tether means comprises: at least one piece of material formed into a loop portion (90) about the air bag (50) and a frangible portion (91) extending a substantial length from the loop portion and the frangible portion including securement means, running subtantially along the length of the frangible portion, generally in the forward inflation direction of the inflating air bag, for permitting the frangible portion to open in a sequential or serial manner restrainging the forward motion of the air bag as it opens.

18. The device as defined in claim 17 wherein the air bag (50) is received within a cavity of a housing (24), in a folded configuration and when inflated by inflation gas expands through an open top to an inflated configuration to protect an occupant.

19. The device as defined in claim 17 wherein the frangible portion (91) comprises first and second panel portions (72a,b) joined together forming a joined portion, the joined portion being completely separated as the air bag inflates toward the occupant.

20. The device as defined in claim 17 wherein the external tether means is formed by two pieces of joined material.

21. The device as defined in claim 17 wherein the loop (90) has a diameter greater than that of the folded air bag to provided an off-set (81) therebetween to enable the air bag to expand forwardly a small distance from a housing and thereafter to expanded laterally out from the housing.

22. A vehicle occupant safety device comprising:

an air bag (50) initially in a folded configuration and when inflatable by inflation gas expands to an inflated configuration to protect the occupant;

external tether means (70) initially about a portion of the exterior of the folded air bag, comprising at least one open sided, breakable band for initially retarding the forward motion of the inflating air bag toward an occupant and for permitting the inflating air bag to inflate laterally or sideways while its forward motion is retarded and thereafter after the band is fully opened, to permit the air bag to inflate forwardly without retardation, wherein the external tether means comprises: at least one piece of material formed into a loop portion (90) about the air bag (50) and a frangible portion (91) extending a substantial distance from the loop portion and openable in a sequential or serial manner by the forward motion of the air bag.

23. A vehicle occupant safety device comprising:

air bag (50) initially in a folded configuration and when inflated by inflation gas expanding to an inflated configuration to protect the occupant;

external tether means (70) initially about a portion of the exterior of the folded air bag, for initially retarding the forward motion of the inflating air bag toward an occupant and for permitting the inflating air bag to inflate laterally or sideways while its forward motion is retarded, wherein the external tether means comprises: a first portion including a piece of material positioned forwardly of the folded air bag forming a loop portion thereabout and a frangible portion (91) extending substantially from the loop portion and openable in a sequential or serial manner as the air bag inflates in a forward direction.

* * * * *